United States Patent Office 3,574,164
Patented Apr. 6, 1971

3,574,164
FLAME RETARDANT COMPOSITIONS
Henryk A. Cyba, Evanston, Ill., assignor to Universal
Oil Products Company, Des Plaines, Ill.
No Drawing. Filed Dec. 12, 1968, Ser. No. 783,439
Int. Cl. C08c 27/70; C08f 45/62; C08g 51/62; C08d 11/04
U.S. Cl. 260—45.75
24 Claims

ABSTRACT OF THE DISCLOSURE

Novel compositions of matter comprise (1) a compound containing at least one reactive functional substituent and (2) a salt of a phosphorus compound and the reaction product formed from a polyhalopolyhydropolycyclicdicarboxylic acid, anhydride or ester with an alkanolamine containing a hydroxyl and an amino group. The compounds are exemplified by a composition of matter comprising polypropylene and a salt prepared by reacting 5,6,7,8,9,9 - hexachloro - 1,2,3,4,4a,5,8,8a - octahydro - 5,8 - methano - 2,3 - naphthalenedicarboxylic anhydride with N,N-diethyl ethanolamine and then reacting the resultant reaction product with mixed mono- and di-tridecyl acid ortho-phosphate. These compositions of matter are useful where a high degree of resistance to flame is a required characteristic of the product.

This invention relates to novel compositions of matter comprising a compound containing at least one reactive functional substituent and a phosphate salt of the reaction product of a particular type of dicarboxylic acid or derivative thereof with an alkanolamine. More specifically, the invention relates to these compositions of matter which are useful in situations where a high degree of flame resistance or flame retardancy is a required physical characteristic of the finished product.

The novel compositions of matter will, as hereinbefore set forth, be useful in situations where the product may be subjected to excessive heat or to the action of a possible flame, such places including architectural panels for construction work, wall plugs for electrical connections, soundproofing or insulation in walls, ceilings, etc., cushions for various vehicle seats such as airplane seats, automobile seats, bus seats, truck seats, etc. In addition, the composition of matter when utilized as a constituent of paint, lacquer, varnishes or protective coatings, films, etc. will also impart a flame resistancy to these compounds and therefore render them commercially attractive as articles of commerce. In addition to imparting the desirable physical characteristics of flame retardancy to the various articles of manufacture, the compounds will also be rendered more stable to color changes and therefore will be important components of these compounds whenever it is desirable that discoloration of the finished product is to be avoided or will tend to render such articles unusable. Other desirable physical characteristics of the compositions of matter will be found in the fact that the one component of the compound, besides adding flame retardancy to the various compounds containing at least one reactive functional group, will also preserve such physical properties as elongation, tensile strength, melt index, degree of cross-linking, bending strength, impact strength, etc.

It is therefore an object of this invention to provide novel compositions of matter which possess desirable physical characteristics.

Another object of this invention is to provide novel compositions of matter which possess desirable physical properties of flameproofing and fire retardancy, thereby rendering said compositions of matter important articles of manufacture.

One aspect of this invention will be found in a composition of matter comprising a compound containing at least one reactive functional substituent and a salt of a phosphorus compound selected from the group consisting of phosphate, phosphinate, phosphonate, and thio-derivatives thereof with the reaction product, formed at a temperature of from about 75° C. to about 275° C., of one mole proportion of a compound selected from the group consisting of polyhalopolyhydropolycyclicdicarboxylic acid, anhydride and ester thereof with from one to two mole proportions of an alkanolamine containing only one each of hydroxyl and amino groups.

Another aspect of this invention is found in a composition of matter which comprises polyethylene admixed with a phosphorus salt comprising the reaction product of 5,6,7,8,9,9 - hexachloro - 1,2,3,4,4a,5,8,8a - octahydro-5,8-methano - 2,3 - naphthalenedicarboxylic anhydride which has been reacted with N,N-diethyl ethanolamine and the resulting product thereafter reacted with mixed mono- and di-tridecyl acid ortho-phosphate.

Other objects and embodiments will be found in the following further detailed description of the present invention.

As hereinbefore set forth, the present invention is concerned with novel compositions of matter. One component of these compositions of matter comprises the compound containing at least one reactive functional substituent. The other component of the final composition of matter comprises a salt of a phosphorus compound which has been reacted with the reaction product formed at a temperature of from about 75° C. to about 275° C. of a polyhalopolyhydropolycyclicdicarboxylic acid, anhydride or ester thereof with an alkanolamine containing only one each of hydroxyl and amino groups. The acid, anhydride or ester thereof, which is reacted with the alkanolamine, is any suitable polyhalopolyhydropolycyclicdicarboxylic acid, anhydride, or ester. The polyhalopolyhydropolycyclicdicarboxylic acid may be illustrated by the following general formula:

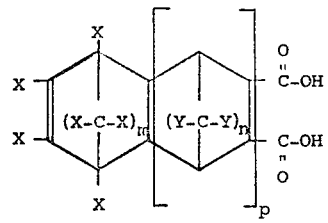

in which X is selected from the group consisting of halogen and particularly chlorine and/or bromine, hydrogen and an alkyl radical of from 1 to 10 and preferably of from 1 to 4 carbon atoms, at least two of the X's being halogen. Y is selected from the group consisting of hydrogen, halogen and an alkyl radical of from 1 to about 10, and preferably of from 1 to about 4 carbon atoms; $m$ is an integer of from 1 to 4; $n$ ranges from 0 to 4; and $p$ ranges from 0 to 4.

The above structure illustrates the dicarboxylic acid. In the interest of simplicity, the corresponding anhydride is not being illustrated, but is readily ascertainable from the above structure.

Referring to the above structure, when X is chlorine, $m$ is one, $n$ is zero and $p$ is zero, the compound is 1,4,5,6,7,7 - hexachlorobicyclo - [2.2.1]-5-heptene-2,3-dicarboxylic acid or the corresponding anhydride. Similarly, when X is chlorine, $m$ is one, $n$ is zero and $p$ is one, the compound is 5,6,7,8,9,9-hexachloro-1,2,3,4,4a,5,8,8a-octahydro-5,8-methano-2,3-naphthalene-dicarboxylic acid or the corresponding anhydride. Also, when X is chlorine, Y is hydrogen, $m$ is one, $n$ is one and $p$ is one, the compound is 5,6,7,8,9,9 - hexachloro-1,2,3,4,4a,5,8,8a-octahydro-1,4,5,8-dimethano-2,3-naphthalenedicarboxylic acid or the corresponding anhydride.

While the particular acid or anhydride set forth above is preferred, it is understood that an ester of the acid may be used for reacting with the alkanolamine. Any suitable ester may be used and is prepared by reacting the acid with a lower alcohol under conditions to liberate alcohol. By lower alcohol I mean an alcohol containing from one to four carbon atoms and thus includes methanol, ethanol, propanol and butanol. In subsequent reaction with the alkanolamine, transesterification occurs to form a new ester. In one embodiment, an acid of this type may be prepared by the Diels-Alder addition reaction of maleic acid and hexachlorocyclopentadiene. The corresponding anhydride is prepared by the reaction of maleic anhydride and hexachlorocyclopentadiene. This acid comprises 1,4,5,6,7,7-hexachlorobicyclo-[2.2.1]-5-heptene-2,3-dicarboxylic acid or the corresponding anhydride. The acid or anhydride are prepared by the reaction of equimolar quantities of the reactants, generally by refluxing in the presence of a solvent.

In place of maleic acid or maleic anhydride, it is understood that other suitable dicarboxylic acids containing carbon to carbon unsaturation may be employed. Illustrative examples include fumaric acid, itaconic acid, citraconic acid, glutaconic acid, etc. Also, in place of hexachlorocyclopentadiene, other suitable halo-substituted cycloalkadienes may be used. Illustrative examples include 1,2-dichlorocyclopentadiene,
1,5-dichlorocyclopentadiene,
1,2,3-trichlorocyclopentadiene,
1,2,3,4-tetrachlorocyclopentadiene,
1,2,3,4,5-pentachlorocyclopentadiene and similar compounds in which all or part of the chlorine is replaced by other halogen and particularly bromine.

A particularly preferred polyhalopolyhydropolycyclicdicarboxylic acid or anhydride is prepared by the Diels-Alder condensation of a conjugated aliphatic diene with an olefinic dicarboxylic acid and then further condensing the resultant cyclohexenedicarboxylic acid with a halocycloalkadiene. A specifically preferred reaction product is the Diels-Alder condensation of 1,3-butadiene with maleic acid to form 1,2,3,6-tetrahydrophthalic acid, followed by the Diels-Alder condensation with hexachlorocyclopentadiene. The product may be named 5,6,7,8,9,9-hexachloro - 1,2,3,4,4a,5,8,8a-octahydro-5,8-methano-2,3-naphthalenedicarboxylic acid. The corresponding anhydride is prepared starting with maleic anhydride instead of maleic acid. The anhydride may be named 5,6,7,8,9,9-hexachloro - 1,2,3,4,4a,5,8,8a-octahydro-5,8-methano-2,3-naphthalenedicarboxylic anhydride. Here again, other conjugated aliphatic dienes may be used including, for example, 2-methyl-1,3-butadiene,
1,3-pentadiene,
1,3-hexadiene,
2,4-hexadiene,
2,3-dimethyl-1,3-butadiene,
1,3-heptadiene,
2,4-heptadiene, conjugated nonadienes, etc., halodienes, as for example, chloroprene and particularly 1-chlorobutadiene and 1,4-dichlorobutadiene. Similarly, other unsaturated dicarboxylic acids may be used including fumaric acid, itaconic acid, citraconic acid, glutaconic acid, mesaconic acid, etc. Also, other halocycloalkadienes may be used including, for example, those specifically hereinbefore set forth.

Still another preferred polyhalopolyhydropolycyclicdicarboxylic acid or anhydride is prepared by condensing cyclopentadiene with maleic acid or maleic anhydride to form norborn-5-ene-2,3-dicarboxylic acid or anhydride and then condensing the same with hexachlorocyclopentadiene. The product may be named 5,6,7,8,9,9-hexachloro-1,2,3,4,4a,5,8,8a - octahydro-1,4,5,8-dimethano-2,3-naphthalenedicarboxylic acid or anhydride. Here again, it is understood that other conjugated cycloaliphatic dienes, other unsaturated dicarboxylic acids or anhydrides and other polyhalocycloalkadienes may be used to prepare suitable polyhalopolyhydropolycyclicdicarboxylic acids or anhydrides.

As hereinbefore set forth, the dicarboxylic acid, anhydride or ester is reacted with an alkanolamine. In a preferred embodiment the alkanolamine is an N,N-di-substituted alkanolamine. Preferred alkanolamines comprise N,N-di-aliphatic alkanolamines in which the aliphatic groups contain from one to about 50 carbon atoms and preferably from one to about 20 carbon atoms. In a particularly preferred embodiment, both aliphatic groups are the same as illustrated in compounds as N,N-dimethyl-ethanolamine,
N,N-diethyl-ethanolamine,
N,N-dipropyl-ethanolamine,
N,N-dibutyl-ethanolamine,
N,N-dipentyl-ethanolamine,
N,N-dihexyl-ethanolamine,
N,N-diheptyl-ethanolamine,
N,N-dioctyl-ethanolamine,
N,N-dinonyl-ethanolamine,
N,N-didecyl-ethanolamine,
N,N-diundecyl-ethanolamine,
N,N-didodecyl-ethanolamine,
N,N-ditridecyl-ethanolamine,
N,N-ditetradecyl-ethanolamine,
N,N-dipentadecyl-ethanolamine,
N,N-dihexadecyl-ethanolamine,
N,N-diheptadecyl-ethanolamine,
N,N-dioctadecyl-ethanolamine,
N,N-dinonadecyl-ethanolamine,
N,N-dieicosyl-ethanolamine, etc.

In another embodiment the aliphatic substituents may be different as illustrated in compounds as N-methyl-N-ethyl-ethanolamine,
N-methyl-N-butyl-ethanolamine,
N-methyl-N-hexyl-ethanolamine,
N-methyl-N-octyl-ethanolamine,
N-methyl-N-decyl-ethanolamine,
N-methyl-N-dodecyl-ethanolamine, etc.,
N-ethyl-N-butyl-ethanolamine,
N-ethyl-N-hexyl-ethanolamine,
N-ethyl-N-octyl-ethanolamine,
N-ethyl-N-decyl-ethanolamine, etc.,
N-propyl-N-pentyl-ethanolamine,
N-propyl-N-heptyl-ethanolamine,
N-propyl-N-nonyl-ethanolamine, etc., it being understood that each of the aliphatic groups may contain from one to 20 or more carbon atoms each.

The specific compounds hereinbefore set forth are examples of N,N-di-aliphatic-ethanolamines. Other alkanolamines include the correspondingly substituted propanolamines, butanolamines, pentanolamines, hexanolamines, heptanolamines, octanolamines and higher alkanolamines. The carbon atoms in the propanolamine and higher alkanolamines may be straight or branched chain.

It is particularly preferred that the alkanolamine is an N,N-di-aliphatic-alkanolamine in which the aliphatic substituents are alkyl groups of from one to about 20 carbon atoms and include particularly the specific compounds hereinbefore set forth. However, in another embodiment, the aliphatic substituents may be alkenyl substituents. Illustrative compounds in this embodiment include N,N-dipropenyl-ethanolamine,
N,N-dipentenyl-ethanolamine,
N,N-diheptenyl-ethanolamine, N,N-dinonenyl-ethanolamine,
N,N-diundecenyl-ethanolamine,
N,N-ditridecenyl-ethanolamine,
N,N-dipentadecenyl-ethanolamine,
N,N-diheptadecenyl-ethanolamine,
N,N-dinonadecenyl-ethanolamine, etc.

In another preferred embodiment the N,N-di-substituted alkanolamine comprises an N,N-dicycloalkyl alkanolamine. Illustrative compounds in this embodiment include N,N-dicyclopentylethanolamine, N,N-dicyclohexyl-ethanolamine, etc., as well as compounds in which the cycloalkyl groups are different as, for example, N-cyclopentyl-N-cyclohexyl-ethanolamine,
N-cyclopentyl-N-cycloheptyl-ethanolamine,
N-cyclopentyl-N-cyclooctyl-ethanolamine,
N-cyclopentyl-N-cyclononyl-ethanolamine,
N-cyclopentyl-N-cyclodecyl-ethanolamine, etc.,
N-cyclohexyl-N-cycloheptyl-ethanolamine, etc.

In still another embodiment the substituted alkanolamine contains one aliphatic and one cyclic group as illustrated in compounds as N-methyl-N-cyclopentyl-ethanolamine,
N-methyl-N-cyclohexyl-ethanolamine,
N-methyl-N-cycloheptyl-ethanolamine
N-methyl-N-cyclooctyl-ethanolamine,
N-methyl-N-cyclodecyl-ethanolamine,
N-methyl-N-cyclododecyl-ethanolamine, etc.,
N-ethyl-N-cyclohexyl-ethanolamine,
N-ethyl-N-cycloheptyl-ethanolamine,
N-propyl-N-cyclohexyl-ethanolamine,
N-butyl-N-cyclohexyl-ethanolamine,
N-amyl-N-cyclohexyl-ethanolamine, etc.

Here again, it is understood that the alkanolamine may comprise correspondingly substituted propanolamines, butanolamines, pentanolamines, hexanolamines, and higher alkanolamines.

In still another embodiment the substituents are aryl as illustrated by

N,N-diphenyl-ethanolamine,
N,N-ditolyl-ethanolamine,
N,N-dixylyl-ethanolamine,
N,N-diethylphenyl-ethanolamine,
N,N-dipropylphenyl-ethanolamine,
N,N-dibutylphenyl-ethanolamine,
N,N-dinaphthyl-ethanolamine,
N,N-dimethylnaphthyl-ethanolamine,
N,N-diethylnaphthyl-ethanolamine, etc., as well as compounds containing different aryl substituents as illustrated by N-phenyl-N-tolyl-ethanolamine,
N-phenyl-N-xylyl-ethanolamine,
N-phenyl-N-ethylphenyl-ethanolamine,
N-phenyl-N-propylphenyl-ethanolamine,
N-phenyl-N-butylphenyl-ethanolamine, etc.,
N-tolyl-N-xylyl-ethanolamine,
N-xylyl-N-ethylphenyl-ethanolamine,
N-xylyl-N-propylphenyl-ethanolamine, etc.

In still another embodiment the alkanolamine may include both an aliphatic and an aryl substituent as illustrated in compounds as N-methyl-N-phenyl-ethanolamine,
N-methyl-N-tolyl-ethanolamine,
N-methyl-N-xylyl-ethanolamine,
N-methyl-N-naphthyl-ethanolamine,
N-ethyl-N-phenyl-ethanolamine,
N-ethyl-N-tolyl-ethanolamine,
N-ethyl-N-xylyl-ethanolamine,
N-propyl-N-phenyl-ethanolamine,
N-propyl-N-tolyl-ethanolamine,
N-propyl-N-xylyl-ethanolamine,
N-butyl-N-phenyl-ethanolamine,
N-butyl-N-tolyl-ethanolamine,
N-butyl-N-xylyl-ethanolamine, etc.

Here again, it is understood that the alkanolamine may comprise the correspondingly substituted propanolamines, butanolamines, pentaolamines, hexanolamines and higher alkanolamines. It is to be noted that the alkanolamines hereinbefore set forth contain a reaction hydroxyl group which will react with the dicarboxylic acid or derivative to form an ester. However, the substituent groups on the nitrogen atom of the alkanolamine preclude further reaction of the nitrogen atom with a dicarboxylic acid or derivative thereof and thereby precludes the formation of a polymeric reaction product as will occur when the alkanolamine contains three reaction sites. The reaction product of the dicarboxylic acid or derivative thereof and the N,N-di-substituted alkanolamine will contain basic nitrogen and thereby permits the formation of a phosphate salt.

The phosphate which is utilized to react with the reaction product resulting from the condensation of the dicarboxylic acid or derivative thereof and the alkanolamine will be selected from the group consisting of alkyl phosphate, alkyl phosphinate, alkyl phosphonate, and the thio-derivatives. Any suitable alkyl phosphates may be used in preparing the salt and will include both the alkyl acid ortho-phosphates and the alkyl acid pyrophosphates. In the alkyl acid ortho-phosphates, the mono-alkyl ester, dialkyl ester, or mixture thereof, may be employed. In the alkyl acid pyrophosphate, the mono-alkyl ester, dialkyl ester, trialkyl ester, or mixture thereof, may be employed, the dialkyl ester being preferred while the ester groups may be attached to the same or different phosphorus atom. Generally, however, this compound will be symmetrical and accordingly, the alkyl ester groups will be attached to different phosphorus atoms.

In the preferred embodiment, the alkyl phosphate contains at least one alkyl group of at least 6 carbon atoms and more particularly from about 6 to about 20 or more carbon atoms. Illustrative alkyl acid ortho-phosphates include mono-hexyl acid ortho-phosphate, dihexyl acid ortho-phosphate, mixture of mono- and di-hexyl acid ortho-phosphate, mono-heptyl acid ortho-phosphate, diheptyl acid ortho-phosphate, mixture of mono- and di-heptyl acid ortho-phosphate, mono-octyl, dioctyl, mixture of mono- and di-octyl acid ortho-phosphate, the corresponding mono- and di-nonyl, decyl, undecyl, dodecyl, tridecyl, tetradecyl, pentadecyl, hexadecyl, heptadecyl, octadecyl, nonadecyl, eicosyl acid ortho-phosphate and mixture thereof, etc. In another embodiment, the preferred alkyl group or groups are selected from methyl, ethyl, propyl, butyl, and pentyl. It is also contemplated within the scope of this invention that a mixture of the phosphate and the alkyl groups of different chain lengths may be employed. In addition, although alkyl groups are preferred, aryl or alkaryl groups may be used successfully where such use is warranted or preferred.

Alkyl acid pyrophosphates will include mono-hexyl, dihexyl, mixture of mono- and di-hexyl acid pyrophosphate, the corresponding mono-hepyl, diheptyl, mono-octyl, dioctyl, mono-nonyl, dinonyl, mono-decyl, didecyl, mono-undecyl, diundecyl, mono-dodecyl, didodecyl, mono-tridecyl, ditridecyl, mono-tetradecyl, dietetradecyl, monopentadecyl, dipentadecyl, mono-hexadecyl, dihexadecyl, mono-heptadecyl, diheptadecyl, mono-octadecyl, dioctadecyl, mono-nonadecyl, dinonadecyl, mono-eicosyl, diesicosyl acid pyrophosphate and mixtures thereof, etc. In another embodiment, as with the ortho-pyrophosphate, it is also contemplated that the preferred alkyl group or groups may be selected from methyl, ethyl, propyl, butyl, and pentyl acid pyrophosphates and that a mixture of the phosphate having alkyl groups of dissimilar chain lengths may also be employed.

Another phosphate for use in preparing the addition reaction product is prepared by the oxyalkylenation of an alcohol, which may be of aliphatic or aromatic configuration, and then forming the phosphate thereof. Aliphatic alcohols for oxyalkylenation may be saturated or unsaturated and preferably contain at least four carbon atoms and more particularly from about six to twenty or more carbon atoms. Illustrative alcohols include butyl alcohol, pentyl alcohol, hexyl alcohol, heptyl alcohol, octyl alcohol, nonyl alcohol, decyl alcohol, undecyl alcohol, dodecyl alcohol, tridecyl alcohol, tetradecyl alchol, pentadecyl alcohol, hexadecyl alcohol, heptadecyl alcohol, octadecyl alcohol, nonadecyl alcohol, eicosyl alcohol, etc. These alcohols conveniently are derived from fatty acids and accordingly include, for example, lauryl alcohol, myristyl alcohol, palmityl alcohol, stearyl alcohol, decylenyl alcohol, dodecylenyl alcohol, pamitoleyl alcohol, oleyl alcohol, linoleyl alcohol, linoelenyl alcohol, gadoleyl alcohol, etc.

Aromatic alcohols will include phenol and particularly alkylphenols. The alkylphenols preferably contain at least four and more particularly from about 6 to about 20 carbon atoms in the alkyl group. Illustrative alkylphenols will include butylphenol, pentylphenol, hexylphenol, heptylphenol, octylphenol, nonylphenol, decylphenol, undecylphenol, dodecylphenol, tridecylphenol, tetradecylphenol, pentadecylphenol, hexadecylphenol, heptadecylphenol, octadecylphenol, nonadecylphenol, eicosylphenol, etc., as well as dialkyl and trialkyl phenols in which the alkyl groups are selected from those hereinbefore specifically set forth. Also, the polyalkylphenols may contain one or more alkyl groups containing from 1 to 6 carbon atoms and one or more alkyl groups containing from 6 to 20 carbon atoms.

Oxyalkylenation of the aliphatic or aromatic alcohol is effected in any suitable manner. While ethylene oxide is preferred for reaction with the aliphatic or aromatic alcohol, it is understood that propylene oxide, butylene oxide, pentylene oxide, hexylene oxide, etc., may be used. The oxyalkylenation is effected by reacting the alipahtic or aromatic alcohol with the alkylene oxide, particularly ethylene oxide, in the molar ratios to produce the oxyalkylenated alcohol or phenol containing the oxyalkylenated group in the desired proportion. In a preferred embodiment, the oxyalkylenated alcohol or phenol contains from two to about twelve or more and particularly from two to about six oxyalkylene groups. The oxyalkylenation is effected in any suitable manner and generally will be conducted at a temperature of from ambient to about 350° F. and more particularly from about 200° to about 300° F., preferably in the presence of a catalyst such as sodium hydroxide, potassium hydroxide, tertiary amine, quaternary hydroxide, etc. When the oxyalkylenation is to be limited to the addition of one oxy group, the catalyst is used with the alkanols but may be omitted with the alkylphenols. Superatmospheric pressure may be employed and may be within the range of from about 10 to 1000 pounds or more.

The oxyalkylenated aliphatic or aromatic alcohol then is reacted in any suitable manner with $P_2O_5$ to form the desired phosphate. One molar proportion of $P_2O_5$ or other suitable phosphorus oxide is reacted per one or two molar proportions of the oxyalkylenated hydrocarbon. In general, an excess of $P_2O_5$ is employed in order to insure complete reaction. The reaction is effected at a temperature within the range of from ambient to about 250° F. and under substatnially anhydrous conditions. The resultant free acid form of the phosphate generally is recovered as a viscous liquid.

Another embodiment comprises an alkyl thiophosphate salt. Illustrative preferred alkyl thiophosphates include mono - hexyl - dithiophosphate, di-hexyl-dithiophosphate, mixture of mono- and di-hexyl-dithiophosphate, monoheptyl - dithiophosphate, di-heptyl-dithiophosphate, mixture of mono- and diheptyl-dithiophosphate, mono-octyl-, dioctyl-, and mono-nonyl-, di-nnyl-, mono-decyl-, didecyl-, monoundecyl-, diundecyl-, mono-dodecyl-, didodecyl-, mono-tridecyl-, ditridecyl-, mono-tetra-decyl-, ditetradecyl-, moon-pentadecyl-, dipentadecyl-, mono-hexadecyl-, dihexadecyl-, mono-heptadecyl-, diheptadecyl-, mono-octadecyl-, dioctadecyl-, mono-nonadecyl-, dinonadecyl-, mono-eicosyl-, dieicosyl-dithiphosphates and mixtures, thereof, etc.

The oxyalkylenated aliphatic or aromatic alcohol dithiophosphates are prepared in substantially the same manner as hereinbefore set forth for the oxyalklenated aliphatic or aromatic alcohol phosphates, except that $P_2S_5$ or other suitable phosphate sulfide is used instead of the phosphorus oxide. Illustrative preferred oxyalkylenated alkylphenol dithiophosphates include di-(oxyethylenated hexylphenol)-dithiophosphate containing from 1 to 15 oxyethylene groups, di-(oxyethylenated dihexylphenol)-dithiophosphate containing from 1 to 15 oxyethylene groups, di-(oxyethylenated heptylphenol)-dithiophosphate containing from 1 to 15 oxyethylene groups, di-(oxyethylenated diheptylphenol) - dithiophosphate containing from 1 to 15 oxyethylene groups, di-oxyethylenated nonylphenol)-dithiophosphate containing from 1 to 15 oxyethylene groups, di-(oxyethylenated dinonylphenol)-dithiophosphate containing from 1 to 15 oxyethylene groups, the corresponding decylphenol, didecylphenol, undecylphenol, diundecylphenol, dodecylphenol, didodecylphenol compounds, etc. It is also contemplated and understood that the corresponding mono-oxyalkylenated alkylphenl dithiophosphates or the corresponding oxyalkylenated alkylphenl mono-thiophosphates may also be used, and in addition, that the corresponding oxyalkylenated compounds in which the oxyalkylene groups contain from 3 to 8 or more carbon atoms may be used. As is used in the present specification and appended claims, it is understood that the number of oxyalkylene groups means the number thereof per each alkylphenol group or each alkyl group derived from the aliphatic alcohol.

Although alkyl or dialkyl phosphoric, phosphonic or phosphinic acids and their thio-analogs are preferred, in some cases aryl or alkaryl or polyalkaryl phosphoric, phosphonic, or phosphinic acids may be used and in addition that the alkyl or aryl groups may be substituted by halogen, especially chlorine or bromine.

It is to be understood that the aforementioned polyhalopolyhydropolycyclicdicarboxylic acids, anhydrides, and esters thereof; the alkanolamines; and the phosphorus compounds hereinbefore enumerated, are only representative of the class of compounds which may be used, and that the present invention is not necessarily limited thereto.

The alkanolamine is reacted with the polycarboxylic acid, anhydride or ester in any suitable manner. The reaction generally is effected at a temperature above about 175° F. and preferably at a higher temperature, which usually will not exceed about 500° F., although higher or lower temperatures may be employed under certain conditions. The exact temperature will depend upon whether a solvent is used and, when employed, on the particular solvent. For example, with benzene as the solvent, the temperature will be of the order of 175° F., with toluene the temperature will be of the order of 250° F., and with xylene the order of 300–320° F. Other preferred solvents include cumene, naphtha, decalin, etc. Any suitable amount of the solvent may be employed but preferably should not comprise a large excess because this will tend to lower the reaction temperature and slow the reaction. Water formed during the reaction may be removed in any suitable manner including, for example, by operating under reduced pressure, by removing an azeotrope of water-solvent, by distilling the reaction product at an elevated temperature, etc. A higher temperature may be utilized in order to remove the water as it is formed. The time of reaction is sufficient to effect the desired reaction and, in general, will range from about two to about forty hours or more. Preferably one or two mole proportions of the alkanolamine are reacted per one mole proportion of the acid, anhydride or ester.

As hereinbefore set forth the reaction product of dicarboxylic acid and alkanolamine will comprise an ester. When a lower ester of the dicarboxylic acid is reacted with the alkanolamine, the product also will comprise a new ester formed by transesterification. When the alkanolamine is unsubstituted or contains only one substituent on the nitrogen atom, the reaction product probably will include polymers.

The phosphate, thiophosphate, phosphinate or phosphonate salt of the reaction product described above is prepared in any suitable manner. In general, the phosphate, thiophosphate, etc., is used in a proportion of from about 0.5 to about 2 acidic equivalents of phosphate or thiophosphate per one basic equivalent of the reaction product. The reaction conveniently is effected by intimately mixing the reactants at ambient temperature although, when desired, an elevated temperature may be employed. In general, the temperature will be within the range of from atmospheric to about 200° F. and, in some cases, up to 300° F., although temperatures outside of this range may be employed depending upon the specific reactants and solvent utilized. The mixing may be effected at atmospheric pressure or, when desired, under superatmospheric pressure which may be within the range of from about 5 to 100 pounds per square inch or more. The time of mixing and reacting will rang from a fraction of an hour to twenty-four hours or more and generally from about one-quarter to about two hours. The reaction is an exothermic one and almost instantaneous, the time of mixing being determined more by the rate of addition of the ingredients and the geometry of the system than the rate of the reaction.

The reaction of the phosphate with the reaction product generally is exothermic and preferably is controlled by effecting the reaction in the presence of an inert solvent. Any suitable solvent may be employed, an aromatic hydrocarbon and alcohols being particularly preferred. The aromatic hydrocarbons include benzene, toluene, xylene, ethylbenzene, cumene, decalin, tetralin, etc. Other solvents include saturated aliphatic esters as ethyl acetate, amyl acetate, 2-ethylhexyl acetate, methyl propionate, methyl butyrate, ethyl butyrate, isopropyl butyrate, etc., methyl alcohol, ethyl alcohol, isopropyl alcohol, etc., saturated aliphatic nitriles as acetonitrile, propionitrile, etc., dioxane, nitrobenzene, chlorobenzene, chloroform, carbon tetrachloride, etc. The reaction normally is effected in the absence of a catalyst.

As hereinbefore set forth the salt is admixed with a compound containing at least one reactive functional substituent whereby desirable physical characteristics such flame retradancy or flameproofing is added to the finished composition of matter. Some illustrative examples of compounds which contain at least one reactive functional substituent which are admixed with the phosphate salt of the reaction product of a dicarboxylic acid, anhydride or ester thereof and an alkanolamine will include plastics, polymers, co-polymers, terpolymers, naturally occurring textiles or fabrics such as cotton, wool, linen, etc., naturally occurring and synthetic rubber, leather and other fibers such as wool, cotton, synthetic fibers known in the trade as Nylon, Dacron, Rayon, etc. Examples of polymers and co-polymers which may be treated with these salts to form novel compositions of matter will include an acrylonitrile-butadiene-styrene formulation (commonly known as ABS); foams such as polyurethane formulations; polyesters such as those prepared from maleic anhydride and ethylene glycol; polyolefins such as polyethylene, polypropylene, polybutylene, ethylenepropylene, polyisoprene, polystyrene, terpolymers, etc.; polyphenyl ethers (polyphenylene oxide) which may or may not have been modified with styrene; acrylate and methacrylate polymers and co-polymers, polyamides; polyoxymethylenes, polyalkylene oxides such as polyethylene oxide, polypropylene oxide; allyl resins and furan resins; phenolic resins; polysulfones; various cellulose derivatives such as the acetate, butyrate, acetate-butyrate, nitrile cellulose, cellulose propionate derivatives, etc. These various compounds containing at least one reactive substituent are only representative of the class of compounds and it is to be understood that the present invention is not necessarily limited thereto.

The phosphate salt of the reaction product of a dicarboxylic acid, anhydride, or ester thereof and an alkanolamine will be present in the finished composition of matter in an amount ranging from about 5 to about 25% by weight thereof. The corporation of the final composition of matter may be effected in any suitable manner depending upon the physical state of the reactants or components of the mixture. For example, the phosphate salt may be recovered as a viscous liquid or a resinous product and may be used as such or as a solution in a suitable solvent including, for example, saturated paraffinic hydrocarbons including pentane, hexane, heptane, octane, etc.; aromatic hydrocarbons including benzene, toluene, xylene, cumene, etc.; decalin, tetralin; alcohols, ketones, etc. When the phosphate salt is recovered as a resinous product in a solid state which may be admixed with the particular compound containing at least one reactive functional substituent by physically admixing the components in a mixer, by milling, etc., the only criterion which must be met in forming the final composition of matter being that the two components are so thoroughly admixed in such a manner so as to impart a uniform degree of flame retardancy or fireproofing throughout the entire final composition of matter.

Illustrative examples of the novel compositions of matter which may be prepared according to the process hereinbefore set forth will include polypropylene and the tridecyl acid ortho-phosphate salts of the reaction product of 5,6,7,8,9,9-hexachloro-1,2,3,4,4a,5,8,8a-octahydro-5,8-methano-2,3-naphthalenedicarboxylic anhydride and N,N-diethyl ethanolamine; polyphenylene oxide and the tridecyl acid ortho-phosphate salts of the reaction product of 5,6,7,8,9,9-hexachloro-1,2,3,4,4a,5,8,8a - octahydro - 5,8-methano-2,3-naphthalenedicarboxylic anhydride and N,N-diethyl ethanolamine; polystyrene and the tridecyl acid ortho-phosphate salts of the reaction product of 5,6,7,8, 9,9-hexachloro-1,2,3,4,4a,5,8,8a-octahydro-5,8 - methano-2,3-naphthalenedicarboxylic anhydride and N,N-diethyl ethanolamine; ABS and the tridecyl acid ortho-phosphate salts of the reaction product of 5,6,7,8,9,9-hexachloro-1,2,3,4,4a,5,8,8a-octahydro-5,8-methano - 2,3 - naphthalenedicarboxylic anhydride and N,N-diethyl ethanolamine; polyisoprene and the tridecyl acid ortho-phosphate salts of the reaction product of 5,6,7,8,9,9-hexachloro-1,2,3,4, 4a,5,8,8a-octahydro-5,8-methano - 2,3 - naphthalenedicarboxylic anhydride and N,N-diethyl ethanolamine; an epoxy resin and the tridecyl acid ortho-phosphate salts of the reaction product of 5,6,7,8,9,9-hexachloro-1,2,3,4,4a, 5,8,8a-octahydro-5,8 - methano - 2,3 - naphthalenedicarboxylic anhydride and N,N-diethyl ethanolamine; a polyester and the tridecyl acid ortho-phosphate salts of the reaction product of 5,6,7,8,9,9-hexachloro-1,2,3,4,4a,5,8, 8a-octahydro-5,8-methano - 2,3 - naphthalenedicarboxylic anhydride and N,N-diethyl ethanolamine; polyethylene and the di-(oxyethylenated nonylphenol)-phosphate salt of the reaction product of 5,6,7,8,9,9-hexachloro-1,2,3,4, 4a,5,8,8a-octahydro-5,8-methano - 2,3 - naphthalenedicarboxylic anhydride and N,N-dicyclohexyl ethanolamine; polypropylene and the di-(oxyethylenated nonylphenol)-phosphate salt of the reaction product of 5,6,7,8,9,9-hexachloro - 1,2,3,4,4a,5,8,8a - octahydro-5,8-methano-2,3-naphthalenedicarboxylic anhydride and N,N-dicyclohexyl ethanolamine; ABS and the di-(oxyethylenated nonylphenol)-phosphate salt of the reaction product of 5,6,7,8,9,9-hexachloro-1,2,3,4,4a,5,8,8a - octahydro - 5,8- methano-2,3-naphthalenedicarboxylic anhydride and N,N-dicyclohexyl ethanolamine; an epoxy resin and the di-(oxyethylenated nonylphenol)-phosphate salt of the reaction product of 5,6,7,8,9,9-hexachloro-1,2,3,4,4a,5,8,8a-octahydro - 5,8 - methano - 2,3 - naphthalenedicarboxylic anhydride and N,N-dicyclohexyl ethanolamine; a polyester and the di-(oxyethylenated nonylphenol)-phosphate salt of the reaction product of 5,6,7,8,9,9-hexachloro-1,2,3,4, 4a,5,8,8a - octahydro - 5,8 - methano-2,3-naphthalenedicarboxylic anhydride and N,N-dicyclohexyl ethanolamine; polyisoprene and the di-(oxyethylenated nonylphenol)-phosphate salt of the reaction product of 5,6,7,8,9,9- hexachloro - 1,2,3,4,4a,5,8,8a - octahydro - 5,8-methano-2,3-naphthalenedicarboxylic anhydride and N,N-dicyclohexyl ethanolamine; polyphenylene oxide and the di-(oxyethylenated nonylphenol)-phosphate salt of the reaction product of 5,6,7,8,9,9-hexachloro-1,2,3,4,4a,5,8,8a-octahydro-5,8-methano-2,3 - naphthalenedicarboxylic anhydride and N,N-dicyclohexyl ethanolamine; polyoxymethylene and the di(oxyethylenated nonylphenol)-phosphate salt of the reaction product of 5,6,7,8,9,9-hexachloro-1,2,3,4,4a,5,8, 8a-octahydro-5,8-methano - 2,3 - naphthalenedicarboxylic anhydride and N,N-dicyclohexyl ethanolamine; polypropylene and the tridecyl acid orthophosphate salts of the reaction product of 1,4,5,6,7,7-hexachlorobicyclo-[2.2.1]-5-heptene - 2,3 - dicarboxylic acid and N,N-dicyclohexyl ethanolamine; ABS and the tridecyl acid orthophosphate salts of the reaction product of 1,4,5,6,7,7-hexachlorobicyclo-[2.2.1]-5-heptene-2,3-dicarboxylic acid and N,N-dicyclohexyl ethanolamine; polyisoprene and the tridecyl acid ortho-phosphate salts of the reaction product of 1,4, 5,6,7,7-hexachlorobicyclo-[2.2.1]-5-heptene - 2,3 - dicarboxylic acid and N,N-dicyclohexyl ethanolamine; an epoxy resin and the tridecyl acid ortho-phosphate salts of the reaction product of 1,4,5,6,7,7 - hexachlorobicyclo-[2.2.1]-5-heptene-2,3-dicarboxylic acid and N,N-dicyclohexyl ethanolamine; a polyester and the tridecyl acid ortho-phosphate salts of the reaction product of 1,4,5,6, 7,7-hexachlorobicyclo-[2.2.1]-5-heptene-2,3 - dicarboxylic acid and N,N-dicyclohexyl ethanolamine; etc.

It is also contemplated within the scope of this invention that the aforementioned novel compositions of matter may also contain a compound containing a metal of Group IV–A of the Periodic Table, a compound containing a metal of Group V–A of the Periodic Table, or a combination of both compounds, the addition of these compounds to the novel composition of matter affording a synergistic effect of the flameproofing or fire-retardant properies. Examples of compounds containing a metal of Group IV–A of the Periodic Table such as germanium, tin, and lead, the preferred compound comprising a tin-containing compound will include those preferably in which the tin is in a tetra-valence state, including inorganic compounds such as tin dioxide, tin tetrachloride, or organo tin compounds such as methyl tin trichloride, ethyl tin trichloride, propyl tin trichloride, butyl tin trichloride, dimethyl tin dichloride, diethyl tin dichloride, dipropyl tin dichloride, dibutyl tin dichloride, trimethyl tin chloride, triethyl tin chloride, tripropyl tin chloride, tributyl tin chloride, mono-methyl tin triacetate, mono-ethyl tin triacetate, mono-propyl tin triacetate, mono-butyl tin triacetate, dimethyl tin diacetate, diethyl tin diacetate, dipropyl tin diacetate, dibutyl tin diacetate, trimethyl tin acetate, triethyl tin acetate, tripropyl tin acetate, tributyl tin acetate, mono-methyl tin tripropionate, mono-ethyl tin tripropionate, mono-propyl tin tripropionate, mono-butyl tin tripropionate, dimethyl tin dipropionate, diethyl tin dipropionate, dipropyl tin dipropionate, dibutyl tin dipropionate, trimethyl tin propionate, triethyl tin propionate, tripropyl tin propionate, tributyl tin propionate, dimethyl tin dimaleate, diethyl tin dimaleate, dipropyl tin dimaleate, dibutyl tin dimaleate, dimethyl tin diadipates, diethyl tin diadipates, dipropyl tin diadipates, dibutyl tin diadipates, dimethyl tin disuccinates, diethyl tin disuccinates, dipropyl tin disuccinates, dibutyl tin disuccinates, dimethyl tin dimalonates, diethyl tin dimalonates, dipropyl tin dimalonates, dibutyl tin dimalonates, phenyl tin trichloride, diphenyl tin dichloride, diphenyl tin oxide, triphenyl tin chloride, triphenyl vinyl tin chloride, triphenyl tin acetate, diphenyl tin acetate, hexaphenyl tin acetate, hexabutyl tin acetate, dilauryl tin dichloride, tetralauryl tin dichloride, benzyl tin trichloride, dibenzyl tin dichloride, tribenzyl tin chloride, tetravinyl tin chloride, tetraallyl tin chloride, etc., the corresponding germanium and lead compounds, etc.

In addition to the aforementioned compounds comprising tin derivatives, it is also contemplated that compounds containing tin-sulfur bonds may be utilized as synergists to afford greater flame-retardant or fire-proofing properties to the desired compositions of matter. These compounds containing tin-sulfur bonds are the reaction product of an alkyl tin oxide with sulfur-containing compounds such as mercapto acetic acid, mercapto propionic acid, the ester of mercapto acetic acid, mercapto propionic acid, etc., alkyl mercaptanes or alkyl dimercaptanes, the resultant products being polymeric tin mercaptides. Representative examples of these compounds will include dibutyl tin di-(lauryl mercaptide), dibutyl tin mercaptide dicarboxylates, dibutyl tin thioglycolates such as dibutyl tin di-(iso-octyl thioglycolate), dioctyl tin di-(iso-octyl thioglycolates), etc.

Representative examples of compounds containing a metal of Group V–A of the Periodic Table such as antimony or bismuth include antimony trioxide, antimony oxy chloride, trimethyl antimony, triethyl antimony, tripropyl antimony, tributyl antimony, triamyl antimony, triphenyl antimony, tribenzyl antimony, trimethyl antimony trichloride, triethyl antimony trichloride, tributyl antimony trichloride, triphenyl antimony trichloride, tribenzyl antimony trichloride, trimethyl antimony sulfide, triethyl antimony sulfide, tripropyl antimony sulfide, tributyl antimony sulfide, triphenyl antimony sulfide, tribenzyl antimony sulfide, the corresponding bismuth compounds, etc.

It is to be understood that the aforementioned novel compositions of matter are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example 425 grams (1.0 mole) of 5,6,7,8,9,9-hexachloro - 1,2,3,4,4a,5,8,8a - octahydro - 5,8-methano-2,3-naphthalenedicarboxylic anhydride, dissolved in 200 grams of toluene, were placed in a reaction vessel and 196 grams (2.2 mole) of N-dimethyl ethanolamine were added during a period of about 10 minutes. The reaction was exothermic in nature, the water of condensation being collected in a Dean Stark trap attached to the apparatus. After a period of 9 hours, 17.5 cc. of water was collected. Following this, the toluene was removed by distilling the mixture at a temperature of 150° C. at a pressure of 1 mm. mercury, 552 grams of product being recovered. An additional amount comprising 45 grams of N-dimethyl ethanolamine was added and the mixture refluxed for an additional period of 16 hours, 8.2 cc. of water being collected and removed. Toluene was again removed to yield 488 grams of the desired product comprising the dimethyl ethanol ester of 5,6,7,8,9,9-hexachloro - 1,2,3,4,4a,5,8,8a-octahydro-5,8-methano-2,3-naphthalenedicarboxylic acid. The product was subjected to analysis and was found to contain 4.3% basic nitrogen as compared to the calculated value of 4.8%.

Following this, 324 grams of the bis-ester was reacted with 154 grams of mono-butyl acid phosphate. The reaction was exothermic in nature and was allowed to proceed for a period of about 1 hour. At the end of this time, the desired product comprising the phosphate salt of the bisester prepared according to the above paragraph was recovered. This compound was also subjected to analysis and was found to contain 2.7% basic nitrogen as compared to the calculated value of 2.9% nitrogen.

EXAMPLE II

To a reaction vessel provided with a Dean Stark water recovery apparatus were added 425 grams (1.0 mole) of 5,6,7,8,9,9 - hexachloro - 1,2,3,4,4a,5,8,8a - octahydro-5, 8-methano - 2,3 - naphthalenedicarboxylic anhydride and 257.8 grams (2.2 mole) of N-diethyl ethanolamine along with 200 grams of toluene. After 12 hours of refluxing the mixture, 17.0 cc. of water were collected. The reaction mixture was heated under high vacuum to 160° C. to remove the toluene solvent, there being recovered 610 grams of the reaction product. The product was analyzed and was found to contain 4.1% nitrogen as compared to a calculated value of 4.6%.

Following this, 345 grams of the product prepared according to the above paragraph was reacted with 158 grams of benzene phosphonic acid. An exothermic reaction resulted after dissolving the product in 100 grams of methyl alcohol. After a period of about two hours had elapsed, the reaction mixture was subjected to fractional distillation at a temperature of about 100° C. and a pressure of 1 mm. mercury to remove the methyl alcohol solvent. The phosphate salt was subjected to analysis, said analysis disclosing the presence of 2.79% nitrogen which corresponds to the identical value which was calculated for the compound.

EXAMPLE III

In this example 1 mole of N-methyl diethanolamine is reacted with 1 mole of 5,6,7,8,9,9 - hexachloro - 1,2,3,4, 4a,5,8,8a - octahydro - 5,8 - methano - 2,3 - naphthalenedicarboxylic anhydride which has been dissolved in toluene at reflux conditions for a period of 16 hours. During this reaction time, 18 cc. of water are condensed in the Dean Stark water trap and recovered. The toluene solvent is removed by subjecting the reaction mixture to fractional distillation under reduced pressure. The resulting adduct will be found to contain 2.6% basic nitrogen.

Following this, 263 grams of the product prepared according to the above paragraph is reacted with 82.2 grams of mono-methyl phosphonic acid, the reaction being exothermic in nature. The desired product which comprises a phosphonic acid salt of the adduct is a resinous solid which contains 4.5% phosphorus.

EXAMPLE IV

In this example 370.5 grams of 1,4,5,6,7,7 - hexachlorobicyclo - [2.2.1] - 5 - heptene - 2,3 - dichrboxylic acid anhydride dissolved in 200 grams of toluene is reacted with 187 grams of N-cyclohexyl diethanolamine in an apparatus provided with a water trap at reflux temperatures. During the reaction time, which lasts for about 12 hours, 18 cc. of water are collected in the Dean Stark water trap. At the end of the reaction time, the mixture is subjected to fractional distillation under reduced pressure to remove the toluene, the resulting adduct containing 2.5% basic nitrogen.

The adduct of the amine and anhydride prepared according to the above paragraph comprising 537.5 grams, is dissolved in 300 grams of methyl alcohol and reacted being exothermic in nature. At the end of the reaction time which is over 0.5 hour in duration, the methyl alcohol is evaporated under reduced pressure and the desired product comprising the phosphonic acid salt of the adduct is found to contain 4.4% phosphorus.

EXAMPLE V

A mixture of 370.5 grams of 1,4,5,6,7,7 - hexachlorobicyclo - [2.2.1] - 5 - heptene - 2,3 - dicarboxylic anhydride dissolved in 200 grams of xylene is reacted with 260 grams of N-(p-bromophenyl)-diethanolamine at reflux temperature for a period of 18 hours, 18 grams of water being collected in the Dean Stark water tube connected to the reaction vessel. At the end of this time the xylene solvent is removed by fractional distillation and the resultant product is found to contain 5.4% of available nitrogen. Following this, 612.5 grams of the reaction product is reacted with one mole of phosphonic acid in an exothermic reaction to give a phosphonic acid salt of the adduct.

EXAMPLE VI

A mixture comprising 425 grams of 5,6,7,8,9,9 - hexachloro - 1,2,3,4,4a,5,8,8a - octahydro - 5,8 - methano-2,3 - naphthalenedicarboxylic anhydride dissolved in 400 grams of xylene is reacted with 488 grams of N-methyl-N-hydroxypropyl - p - bromoaniline in a reaction vessel provided with a Dean Stark water tube at reflux conditions, 18 grams of water being collected during the reaction period. At the end of 20 hours the xylene solvent is removed by fractional distillation under reduced pressure and the resultant adduct is reacted with 2 moles of phosphonic acid in an exothermic reaction to yield the phosphonic acid salt of the adduct.

EXAMPLE VII

A novel composition of matter of the present invention is prepared by admixing 15.4 grams of the phosphate salt of the ester prepared according to Example I above with 84.6 grams of a commercial high molecular weight polypropylene. To illustrate the flame-retardant property of the phosphate salt of the adduct, a combustion test was made. A strip of commercial polypropylene was prepared containing 0.15% of a commercial phenolic oxidation inhibitor, said strip containing a glass cloth in the middle of the strip. This strip was labeled "A." Another strip was made utilizing the mixture of the phosphate salt of the adduct and polypropylene, said strip also containing 0.15% of a commercial phenolic oxidation inhibitor and glass cloth to prevent dripping. This strip was labeled "B." The two strips were then burned in an apparatus similar to one described by C. P. Fenimore and J. F. Martin in the November 1966 issue of Modern Plastics. Strip "A," which did not contain the phosphate salt of the adduct had an oxygen index (the lowest mole fraction of oxygen sufficient to maintain combustion) of 0.181. In contrast to this, the oxygen index of the strip which contains the phosphate salt of the adduct will have an oxygen index in excess of 0.19.

EXAMPLE VIII

To illustrate the synergistic effect of a ternary composition of matter, another strip was prepared by admixing 15.4 grams of the phosphate salt of the adduct prepared according to Example I, 3 grams of antimhony trioxide and 81.5 grams of a commercial high molecular weight polypropylene. The composition is milled on a mill for five minutes at a temperature of about 190° C. A strip is pressed out which contains a glass cloth in the center to prevent dripping. This strip is burned in an apparatus similar to that used in Example VII above, the ternary composition of matter will be found to have an oxygen index in excess of 0.21, which is the index above which ordinary compounds will not burn without the addition of an extraneous source of oxygen.

EXAMPLE IX

In this example a quaternary composition of matter is prepared by admixing 15.4 grams of the phosphate salt of the adduct prepared according to Example I, 3 grams of antimony trioxide, 1 gram of dibutyl tin maleate and 80.6 grams of a commercial polypropylene. The mixture is milled for a period of 5 minutes at 190° C. and a strip is pressed out containing a glass cloth in the middle to prevent dripping. This strip is also subjected to a combustion test similar to that described in Example VII above.

The oxygen index of this strip of polypropylene was found to have an oxygen index in excess of 0.21.

EXAMPLE X

A novel composition of matter is prepared by admixing 16.2 grams of the phosphate salt of the adduct prepared according to Example II above with 83.8 grams of a commercial ABS (terpolymer of acrylonitrile-butadiene-styrene) compound. The two components are milled for 5 minutes at a temperature of 190° C. and pressed out as in a strip which contains a glass cloth in the cener. In addition, a second strip is prepared utilizing only the terpolymer of acrylonitrile, butadiene, and styrene without the addition of the phosphate salt of the adduct. The two strips are then subjected to a combustion test similar to that described in Example VII above. The oxygen index of the strip containing only ABS is 0.183; the oxygen index of the novel composition of matter comprising ABS and the phosphate salt of the adduct will have an oxygen index of above 0.19.

EXAMPLE XI

A novel ternary composition of matter of the present invention is prepared by admixing 16.2 grams of the phosphate salt of the adduct prepared acocrding to Example II above, 5 grams of antimony trioxide, and 78.8 grams of a commercial ABS formulation. The three components are milled at a temperature of 190° C. for a period of 5 minutes and the resulting admixture pressed out in strips. The strip is subjected to a combustion test similar to that hereinbefore set forth, it being found that the oxygen index of the composition of matter will be in excess of 0.22.

EXAMPLE XII

A quaternary composition of matter is prepared admixing 16.2 grams of the phosphate salt of the adduct prepared according to Example II, 5 grams of antimony trioxide, 2 grams of dibutyl tin maleate and 76.8 grams of a commercial ABS formulation. The reactants are milled in a way similar to that set forth in the above examples at a temperature of 190° C. for a period of 5 minutes. The strips which are pressed out are then subjected to a combustion test similar to that hereinbefore described, the oxygen index of said strips being found to be in excess of 0.22.

EXAMPLE XIII

A binary composition of matter is prepared by admixing 22.3 grams of the phosphate salt of the adduct prepared according to Example III above with 77.7 grams of a commercial polymethylmethacrylate formulation, said admixture being made in a way similar to that hereinbefore set forth. A strip of this composition is subjected to a combustion test similar to that set forth in Example VII above. In addition a strip of commercial polymethylmethacrylate which does not contain the phosphate salt of the adduct is also subjected to the same combustion test. The strip which contains only the polymethylmethacrylate will be found to have an oxygen index of 0.174, while the oxygen index of the strip containing the phosphate salt of the adduct and the polymethylmethacrylate will be found to have an oxygen index in excess of 0.19.

EXAMPLE XIV

A novel ternary composition of matter of the present invention is prepared by admixing 22.3 grams of the phosphate salt of the adduct prepared according to Example III, 2 grams of dibutyl tin di-(laurylmercaptide) and 75.7 grams of the commercial polymethylmethacrylate. The three compounds are admixed on a mill at a temperature of about 190° C. for a period of 5 minutes. At the end of this time, the mixture is pressed into strips and subjected to a combustion test similar to that hereinbefore described. It will be found that the oxygen index of this ternary composition of matter will be in excess of 0.21.

EXAMPLE XV

A novel quaternary composition of matter of the present invention is prepared by admixing 22.3 grams of the phosphate salt of the adduct prepared according to Example III, 2 grams of dibutyl tin di-(laurylmercaptide), 3 grams of antimony trioxide, and 72.7 grams of a commercial polymethylmethacrylate formulation. The four compounds are milled and subjected to a combustion test, both of which are similar to that described in the above examples. The oxygen index of this composition will be found to be in excess of 0.21.

I claim as my invention:

1. A composition of matter comprising a natural or synthetic polymer containing at least one reactive functional substituent and a salt of a phosphorus compound selected from the group consisting of phosphate, phosphinate, phosphonate, and thio derivatives thereof with the reaction product, formed at a temperature of from about 75° C. to about 275° C., of one mole proportion of a halogen-containing compound selected from the group consisting of polyhalopolyhydropolycyclicidicarboxylic acid, anhydride and ester thereof with from one to two mole proportions of an alkanolamine containing only one each of hydroxyl and amino groups, said phosphorus compound being in a proportion of from about 0.5 to about 2 acidic equivalents per one basic equivalent of said reaction product, and said acid having the formula:

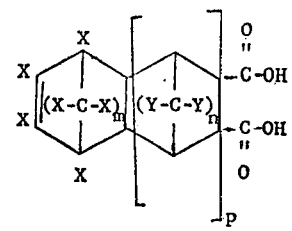

in which X is selected from the group consisting of chlorine, bromine, hydrogen and alkyl of from 1 to 10 carbon atoms, at least two of the X's being chlorine or bromine. Y is selected from the group consisting of chlorine, bromine, hydrogen and alkyl of from 1 to 10 carbon atoms; $m$ is an integer of from 1 to 4; $n$ ranges from 0 to 4; and $p$ ranges from 0 to 4.

2. The composition of matter as set forth in claim 1 in which said halogen-containing compound is 5,6,7,8,9,9-hexachloro-1,2,3,4,4a,5,8,8a-octahydro - 5,8 - methano-2,3-naphthalenedicarboxylic acid.

3. The composition of matter as set forth in claim 1 in which said halogen-containing compound is 5,6,7,8,9,9-hexachloro-1,2,3,4,4a,5,8,8a-octahydro - 5,8 - methano-2,3-naphthalenedicarboxylic anhydride.

4. The composition of matter as set forth in claim 1 in which said halogen-containing compound is 5,6,7,8,9,9-hexachloro - 1,2,3,4,4a,5,8,8a - octahydro-1,4,5,8-dimethano-2,3-naphthalenedicarboxylic acid.

5. The composition of matter as set forth in claim 1 in which said halogen-containing compound is 1,4,5,6,7,7-hexachlorobicyclo-[2.2.1]-5-heptene - 2,3 - dicarboxylic acid.

6. The composition of matter as set forth in claim 1 in which said alkanolamine is N,N-di-substituted alkanolamine.

7. The composition of matter as set forth in claim 1 in which said alkanolamine is N,N-dialkyl alkanolamine.

8. The composition of matter as set forth in claim 1 in which said alkanolamine is N,N-diethyl ethanolamine.

9. The composition of matter as set forth in claim 1 in which said alkanolamine is N,N-dicyclo alkanolamine.

10. The composition of matter as set forth in claim 1 in which said alkanolamine is N,N-dicyclohexyl ethanolamine.

11. The composition of matter as set forth in claim 1 in which said phosphorous compound is di-(oxyalkylenated alkylphenol)-phosphate.

12. The composition of matter as set forth in claim 1 in which said phosphorus compound is di-(oxyalkylenated alkylphenol)-dithiophosphate.

13. The composition of matter as set forth in claim 1 in which said phosphorus compound is diakyl acid orthophosphate.

14. The composition of matter as set forth in claim 1 in which said polymer containing at least one reactive functional substituent is a polyolefin.

15. The composition of matter as set forth in claim 1 in which said polymer containing at least one reactive functional substituent is polypropylene.

16. The composition of matter as set forth in claim 1 in which said polymer containing at least one reactive functional substituent is an acrylonitrile-butadiene-styrene polymer.

17. The composition of matter as set forth in claim 1 in which said polymer containing at least one reactive functional substituent is polyphenylene oxide.

18. The composition of matter as set forth in claim 1 in which said polymer containing at least one reactive functional substituent is polyurethane.

19. The composition of matter as set forth in claim 1 in which said polymer containing at least one reactive functional substituent is an epoxy resin.

20. The composition of matter as set forth in claim 1 in which said composition of matter contains a compound containing a metal of Group IV-A of the Periodic Table.

21. The composition of matter as set forth in claim 1 in which said composition of matter contains a compound containing a metal of Group V-A of the Periodic Table.

22. The composition of matter as set forth in claim 20 in which said compound containing a metal of Group IV-A of the Periodic Table comprises a tin-containing compound.

23. The composition of matter as set forth in claim 21 in which said compound containing a metal of Group V-A of the Periodic Table comprises an antimony-containing compound.

24. The composition of matter as set forth in claim 1 in which said composition contains a compound containing a metal of Group IV-A of the Periodic Table and a compound of Group V-A of the Periodic Table.

References Cited
UNITED STATES PATENTS

| | | | |
|---|---|---|---|
| 2,610,920 | 9/1952 | Hopkinson | 260—45.75 |
| 3,025,262 | 3/1962 | Peters | 260—45.75 |
| 3,365,470 | 1/1968 | Schmerling | 260—2.5 |
| 3,388,191 | 6/1968 | Cyba | 260—924 |
| 3,465,006 | 9/1969 | Schmerling | 260—346.6 |

DONALD E. CZAJA, Primary Examiner

V. P. HOKE, Assistant Examiner

U.S. Cl. X.R.

106—15; 117—137, 138.5; 252—8.1; 260—2.5, 45.8